US007459108B2

(12) United States Patent
Lee et al.

(10) Patent No.: US 7,459,108 B2
(45) Date of Patent: Dec. 2, 2008

(54) METHOD FOR PREPARING METALLIC MEMBRANE

(75) Inventors: Kew-Ho Lee, Daejeon (KR); In-Chul Kim, Daejeon (KR); Soo-Min Lee, Uijeongbu-si (KR); In-Hwan Choi, Seoul (KR)

(73) Assignees: Korea Research Institute of Chemical Technology, Daejeon (KR); Samwon Engineering Co., Ltd., Daejeon (KR)

( * ) Notice: Subject to any disclaimer, the term of this patent is extended or adjusted under 35 U.S.C. 154(b) by 197 days.

(21) Appl. No.: 11/338,247

(22) Filed: Jan. 24, 2006

(65) Prior Publication Data
US 2007/0029251 A1    Feb. 8, 2007

(30) Foreign Application Priority Data
Jul. 27, 2005    (KR)    ........................ 10-2005-0068118

(51) Int. Cl.
B29C 44/04    (2006.01)
B01D 29/00    (2006.01)
B22F 7/00    (2006.01)
B22F 3/10    (2006.01)

(52) U.S. Cl. ............................ 264/45.1; 419/5; 419/58; 210/500.25; 210/500.23; 210/323.2; 55/523; 428/52

(58) Field of Classification Search ............ 210/500.25, 210/490, 500.23, 323.2; 55/523; 264/41, 264/42, 45.1, 125, 127; 419/1–3, 56, 57, 419/58, 62, 68, 37, 5; 428/52
See application file for complete search history.

(56) References Cited

U.S. PATENT DOCUMENTS

| 4,917,857 | A | * | 4/1990 | Jaeckel et al. | .................. | 419/9 |
| 5,364,586 | A | * | 11/1994 | Trusov et al. | .................. | 419/2 |
| 5,523,049 | A | * | 6/1996 | Terpstra et al. | ................. | 419/36 |
| 5,848,351 | A | * | 12/1998 | Hoshino et al. | ............. | 428/550 |
| 6,117,592 | A | * | 9/2000 | Hoshino et al. | ............. | 429/235 |
| 6,355,082 | B1 | * | 3/2002 | Ishibe | ......................... | 55/528 |
| 6,759,004 | B1 | * | 7/2004 | Dwivedi | ........................ | 419/2 |

FOREIGN PATENT DOCUMENTS

| EP | 0765704 A2 | * | 2/1997 |
| KR | 10-1994-0007006 B1 | | 8/1994 |

* cited by examiner

*Primary Examiner*—Ana M Fortuna
(74) *Attorney, Agent, or Firm*—Frommer Lawrence & Haug; LLP; Ronald R. Santucci

(57) ABSTRACT

The present invention relates to a method for preparing a metallic membrane, more particularly to a method for preparing metallic membranes, which comprises dissolving a transition metal of Period 3 and its alloy particle powder and synthetic polymer in a fixed ratio; radiating or casting to prepare a membrane precursor; oxidizing the synthetic polymer on the membrane precursor under a mixed gaseous atmosphere of nitrogen and hydrogen; and sintering the membrane precursor at a predetermined temperature. The metallic membrane prepared by the process of the present invention has excellent mechanical and chemical properties and enables to maintain a relatively small pore size and high porocity than traditional membranes. Therefore, it is useful for water treatment.

17 Claims, 1 Drawing Sheet

METHOD FOR PREPARING METALLIC MEMBRANE

This application claims priority benefits from South Korean Patent Application No. 10-2005-0068118 filed Jul. 27, 2005.

TECHNICAL FIELD

The present invention relates to a method for preparing a metallic membrane, more particularly to a method for preparing a metallic membrane, which comprises: dissolving a transition metal of Period 3 and its alloy particle powder and synthetic polymer in a ratio; radiating or casting it to prepare a membrane precursor; oxidizing the synthetic polymer on the membrane precursor under a mixed gaseous atmosphere of nitrogen and hydrogen; and then, sintering the membrane precursor at a predetermined temperature, which produces a metallic membrane with excellent mechanical and chemical properties and enables to maintain a relatively small pore size and a high porosity than traditional methods thus being useful for water treatment.

BACKGROUND ART

Generally, a polymer membrane is very fragile due to its poor mechanical strength and is easily broken down when scratched by contaminants. Once contaminated by contaminants, the polymer membrane is hard to restore its original properties by physical cleaning (reverse-cleaning) and is very likely to be destroyed. Also, the polymer membrane has a relatively low chemical stability and thus when it is subjected to a chemical wash, it will result in decreasing its physical properties after repetitive washes. Further, the polymer membrane cannot be used to treat wastewater containing pyrogenic contaminants since it is not thermo-resistant.

In order to remedy the above-mentioned disadvantage of the polymer membrane, there has been introduced a ceramic membrane which has improved physical property such as mechanical strength, intensity of reverse-cleaning, intensity of chemical cleaning and thermo-resistance than polymer membrane has been introduced. However, the ceramic membrane is more limited in terms of its application than the polymer membrane because it is brittle.

Nowadays, a metallic membrane is manufactured industrially from GKN Company, Germany. It is prepared rather by a process comprising: (1) compressing metal particles in a frame to mold; and (2) sintering, not by the radiation process. Unfortunately, the metallic membrane is very expensive for the production and is not competitive in cost-wise to be used for water treatment. It is very small in the packing density per unit volume since tube-shaped in a large radius, compared with a hollow polymer membrane. Therefore, the metallic membrane is applied to only limited fields to be substituted for the polymer membrane.

Meanwhile, the hollow membrane is manufactured in a thread shape having a macaroni-like cavity and often utilized as a dialysis membrane to remove minute impurities.

Generally, there have been known a few methods to prepare the hollow membranes: i.e., (a) a method for preparing a flat sheet membrane, wherein inorganic powder is packed and pressed to prepare a membrane in a planar form; (b) a method for hydrolyzing metal alkoxides by a sol-gel process; (c) a method for exploiting a phase transition occurring between a solvent and a non-solvent; and (d) a radiation process for intruding and extruding a filaments-forming material in a plastic fusion or in a solution through an opening for radiation or an aperture in the frame with a certain rate.

The radiation process is broadly classified into three different kinds such as melt radiation, dry radiation and humid radiation, depending upon its modes. In detail, the melt radiation comprises: (1) dissolving polymers; (2) extruding into a liquid solution; and (3) solidifying in the air, under a gaseous atmosphere or in a freezer. The dry radiation is comprises: (1) extruding a polymer solution into a heated air to remove a solvent; and (2) solidifying it to prepare fibers. Finally, the humid radiation comprises: (1) extruding a polymer solution into a coagulation medium; (2) recycling the polymer; and (3) solidifying to prepare filaments.

DISCLOSURE OF INVENTION

In order to resolve the foregoing problems, the inventors of the present invention have made various efforts to adjust the diameter of pores in traditional metallic membranes and improved physical property, chemical stability and the like. As a result, they have succeeded in developing a novel method for preparing a metallic membrane comprising: dissolving a transition metal of Period 3 in a specified range of particle size and its alloy particle powder and a synthetic polymer; radiating or casting it to prepare a membrane precursor; oxidizing the polymer under a mixed gaseous atmosphere of nitrogen and hydrogen; and sintering the membrane precursor. Then, they have found that this process can greatly improve the resulting metallic membrane in the mechanical property and the chemo-resistance, as compared to those of conventional processes and completed the present invention successfully.

Therefore, the object of the present invention is to provide the method for preparing a metallic membrane, comprising: (1) radiating a specific transition metal of Period 3 and its alloy particle powder and synthetic polymer; (2) oxidizing the polymer; and (3) sintering to produce a metallic membrane having excellent mechanical and chemical properties.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
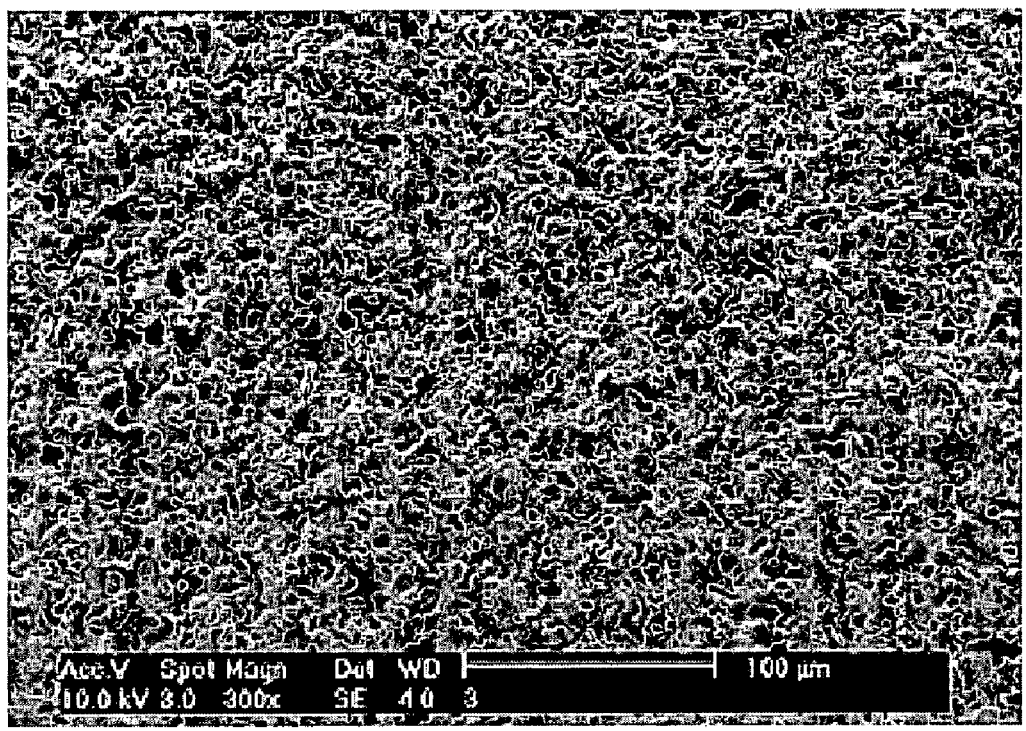
FIG. 1 depicts the electron microscopic image of the surface of nickel hollow membrane prepared in Example 1 according to the present invention.

The present invention has a feature to provide a process for preparing a metallic membrane comprising steps as follows: (1) dissolving 80-95 wt % of transition metal of Period 3 and its alloy particle powder of 0.01-20 µm in size and 5-20 wt % of a synthetic polymer in a polar solvent; (2) radiating or casting it to prepare a membrane precursor; (3) oxidizing the polymer on the membrane precursor in the air at 400-600° C. under a mixed gaseous atmosphere of nitrogen and hydrogen; and (4) sintering the resulting membrane precursor at 900-1,300° C. under a mixed gaseous atmosphere of nitrogen and hydrogen to prepare the membrane.

Hereinafter, the present invention will be described more clearly as follows.

The present invention relates to a method for preparing a metallic membrane that has finer pores in 0.01-10 μm of size than conventional metallic membranes and 30-50% of porocity, by sequentially performing the following process of: (1) adopting a specific metal particle powder and a synthetic polymer; (2) radiating or casting the resultant; (3) oxidizing the synthetic polymer; and (4) sintering the metal.

In fact, Korean Patent Publication No. 1994-7006 discloses a method for preparing porous hollow (thread-like) membranes, wherein conventional inorganic metallic powder and naturally soluble polymers are radiated under a humid condition and sintered by using a phase transition. However, in this art, the natural polymer is injected to a non-solvent such as an acidic solution or a salt solution as a coagulant. Thus, this process becomes more complicated and increases the unit cost of production than traditional processes which uses water as a coagulant. Besides, the additive for enhancing porocity is not very effective in the above art. Further, the inorganic metal powder influences the porocity and the pore size of membrane according to its content, size and dispersion, since it is a ceramic compound. However, this method does not teach or suggest any importance of size and dispersion. Therefore, it is required to develop a method to remedy the defects.

On the contrary, the inventors of the present invention have attempted to enhance the coagulative property of a membrane by using a synthetic polymer instead of a natural polymer and to cope with the brittleness of the membrane by using a metallic compound instead of a ceramic compound as an inorganic metal oxide. In addition, the step oxidizing the synthetic polymer before sintering facilitates the step of sintering a metal compound. Further, this step is accomplished under a mixed gaseous atmosphere of nitrogen/hydrogen without oxygen to prepare a membrane made of pure metal instead of metal oxides.

Hereinafter, the method for preparing metallic membranes of the present invention will be described more clearly as follows.

Above all, a transition metal of Period 3 and its alloy particle powder and a synthetic polymer are dissolved and then the resulting mixture is radiated or cast to prepare a membrane precursor.

Preferably, the transition metal of Period 3 and its alloy particle powder can be selected from the group consisting of nickel, titanium, aluminum, copper, iron and stainless steel, and more preferably, nickel. Nickel is more resistant to oxidation, maintains a uniform pore size because its particle has a uniform size and is relatively low in price to greatly reduce the production cost. Preferably, the metal powder can be adjusted in the range of 0.01-20 μm in particle size. If the particle size is smaller than 0.01 μm, the production cost of metal powder increases to decrease the economical efficiency and further, the metal content cannot increase in more than 40 wt % to decrease the strength of resulting membrane markedly. In contrast, if the particle size is more than 20 μm, the metal powder is hardly used to treat water, because it enlarges pores in more than 5 μm in size. Accordingly, it is important to maintain the range of particle size.

Preferably, the transition metal of Period 3 and its alloy particle powder can be adjusted to be in the range of 80-95 wt % of content. If the content is less than 80 wt %, the resulting membrane reduces in the strength remarkably and cannot exhibit the advantage of metallic membranes as in the present invention. In contrast, if the content is greater than 95 wt %, the polymer solution cannot be dispersed properly. Accordingly it is preferable to appropriately maintain the range of metal content.

The synthetic polymer plays a role of binder to prepare a membrane precursor containing metal powder, before sintering. It is ordinarily utilized in this art and not limited in its kinds. Preferably, the synthetic polymer can be selected from the group consisting of polysulfones, vinyls, polymers, celluloses, nylons and polyesters, and more preferably, polysulfones, vinyls, polymers and celluloses.

Preferably, the synthetic polymer can be contained in the range of 5-20 wt %. If the content is less than 5 wt %, the synthetic polymer cannot work as a binder to prepare a precursor. In contrast, if the content is more than 20 wt %, the polymer solution becomes too viscous to radiate. Accordingly, it is important to maintain the range of content.

The solvent has a feature to dissolve the synthetic polymer and the like. Preferably, the solvent can be a polar solvent selected from the group consisting of N-methyl-2-pyrrolidone, dimethyl formamide, dimethyl acetamide and dimethyl sulfoxide. Preferably, the resulting solution is maintained to have about 20-30 wt % content of metal powder and the synthetic polymer.

In a second step, the polymers in the membrane precursor are oxidized. The oxidation is accomplished at a relatively high temperature by heating in the air to remove the polymers within the membrane precursor. Preferably, the polymers are oxidized at 300-700° C., and more preferably, at 400-600° C. If the temperature is lower than 400° C., it would require a relatively longer period of time and the oxidation of polymers cannot be completed. In contrast, if the temperature is higher than 600° C., the oxidation is proceeded rapidly to deform the membranes severely. Accordingly, it is preferable to maintain the suitable range of temperature.

In a third step, the membrane precursor oxidizing the polymers is sintered to prepare a metallic membrane. In the present invention, pure metal is used instead of a ceramic compound as a conceptual oxide. Preferably, the pure metal is maintained under a mixed gaseous atmosphere of nitrogen and hydrogen without oxygen. Preferably, nitrogen and hydrogen gases are respectively used in the volume ratio of 70-98:2-30. If the volume ratio of hydrogen is below 2, the resulting membrane becomes more fragile because it is oxidized at a relatively high temperature. In contrast, if the volume ratio of hydrogen is over 30, hydrogen cannot be used because there is great risk of explosion at a high temperature. Accordingly, it is important to maintain the suitable range of volume ratio.

Preferably, the gaseous mixture can be utilized at 10-2000 cc/min of flow rate. If the flow rate is less than 10 cc/min, the metallic membrane becomes more brittle because it is oxidized to some extent. In contrast, if the flow rate is greater than 2000 cc/min, the metallic membrane will consume the gas mixture more rapidly thus decreasing the efficiency. Accordingly, it is preferable to maintain the range of the flow rate at a relatively low level. Preferably, the temperature for sintering can be maintained at 900-1300° C. If the temperature is below 900° C., the reaction will not be proceeded properly thus deteriorating physical properties. In contrast, if the temperature is over 1300° C., it results in excessive sintering thus not being able to form pores.

In the present invention, the metallic membrane can be manufactured to retain various forms. Preferably, the metallic membrane can be in a hollow thread-like membrane, a flat sheet membrane or a capillary membrane.

Preferably, the metallic membrane prepared by the process of the present invention has 0.01-10 μm of pore size and 30-50% of porocity. In effects, the metallic membrane of the present invention may greatly improve the mechanical properties such as tensile strength, impact strength and intensity of reverse-cleaning and chemical stability.

EXAMPLES

Practical and presently preferred embodiments of the present invention are illustrated as shown in the following Examples.

However, it will be appreciated that those skilled in the art, on consideration of this disclosure, may make modifications and improvements within the spirit and scope of the present invention.

Example 1

In order to prepare a polymer/metal precursor in a hollow thread-like form, a dispersion solution was prepared as follows.

The dispersion solution comprising 7 wt % of polysulfone, 28 wt % of N-methyl-2-pyrrolidone (NMP), and 65 wt % of nickel powder in 3 μm of size was prepared and injected into a nozzle of radiation in 1.5 mm of radius. Then, the resultant was radiated to have a hollow thread form and coagulated in distilled water to prepare a precursor. Then, the precursor was immersed in water for a day and removed by replacing a solvent for water. Then, the polymers were oxidized in a combustible reactor at high temperature and sintered under nitrogen/hydrogen atmosphere.

Gas mixture was adjusted to 250 cc/min of flow rate, heated to 600° C. by 5° C./min of velocity in the air, maintained for 2 hours to oxidize the polymers. Then, the resultant was heated by 10 ° C./min of velocity, maintained at 1150° C. for 2 hours, completed to be sintered and cooled to 20° C./min.

Figure 2:
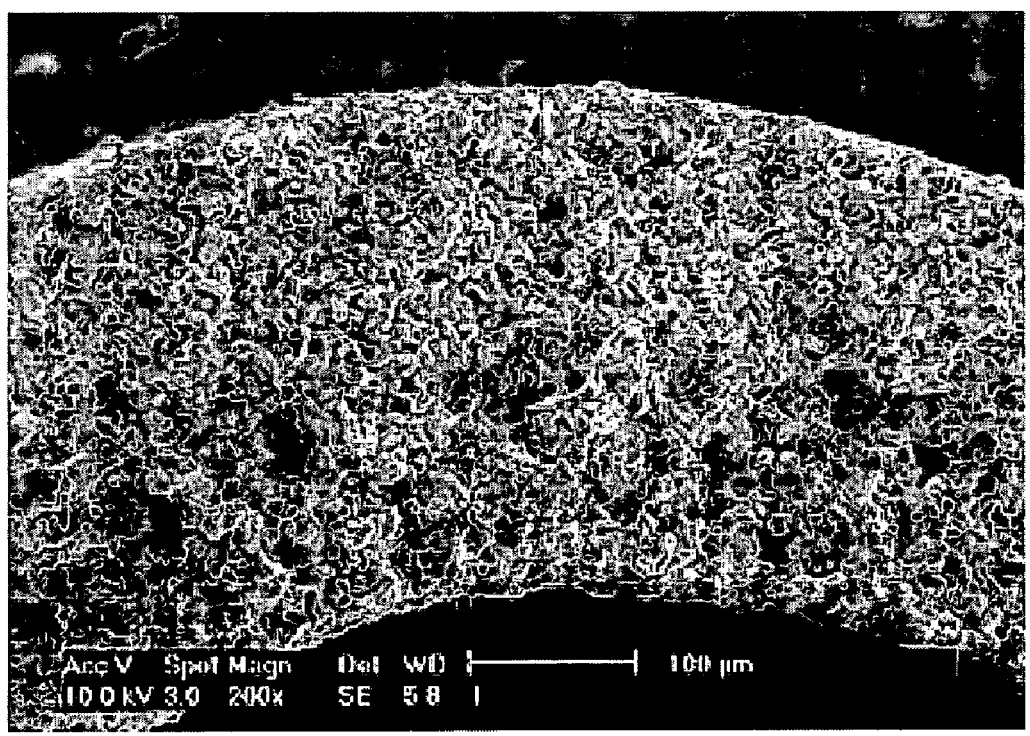
FIG. 2 depicts the electron microscopic image of the cross-section of nickel hollow membrane prepared in Example 1 according to the present invention.

FIG. 1 and FIG. 2 depict the electron microscopic images of the nickel hollow membrane prepared above. As a result, the metallic membrane of the present invention was observed to have 1 mm of radius, 0.1 mm of thickness, 1-2 μm of pore size and approximately 30% of porocity.

Example 2

A nickel hollow membrane was prepared by performing the same procedure described in Example 1, but nickel powder having 0.5 μm of size was used. As a result, the metallic membrane of the present invention was observed to have 0.3 μm of pore size and approximately 40% of porocity.

Example 3

A nickel hollow membrane was prepared by performing the same procedure described in Example 1, but the nozzle for radiation was increased to 8 mm in diameter. As a result, the metallic membrane of the present invention was observed to have 7.4 mm of diameter. The pore size and the porocity were the same as in Example 1. Accordingly, the pore size and the porocity were kept constant even though the nozzle for radiation was increased. Therefore, it is concluded that this procedure can be applied to prepare a metallic membrane in a capillary or tubular form.

Example 4

A metallic membrane was prepared by performing the same procedure described in Example 1, but a flat sheet membrane was prepared instead of a hollow thread-like membrane. The dispersion solution was cast by using a coating blade in 500 μm of thickness, molded, and then, coagulated in water to prepare a flat sheet membrane. Then, the resultant was sintered same as in Example 1 to prepare a nickel membrane.

As a result, the metallic membrane of the present invention was shown to have the same pore size and porocity with the results described in Example 1 and 450 μm of thickness.

Example 5

A metallic membrane was prepared by performing the same procedure described in Example 1, but the kinds of metal powder were varied as follows. The metallic membranes of the present invention were examined to measure the pore size and the porocity. The results are summarized in Table 1.

TABLE 1

| Kinds of metal powder | Pore size (μm) | Porocity (%) |
|---|---|---|
| Titanium | 2.1 | 20 |
| Aluminium | 3.2 | 25 |
| Copper | 2.3 | 19 |
| Stainless steel | 3.5 | 31 |

As illustrated in Table 1, it is clarified that the pore size and the porocity are discriminated according to metal kinds. Especially, nickel was shown to be excellent to other metals.

Example 6

A metallic membrane was prepared by performing the same procedure described in Example 1, but the kinds of polymer were varied as follows. The metallic membranes of the present invention were examined to measure the pore size and, the porocity. The results are summarized in Table 2.

TABLE 2

| Kinds of polymers | Pore size (μm) | Porocity (%) |
|---|---|---|
| Polyvinyliden fluoride | 2.5 | 19 |
| Cellulose acetate | 3.1 | 22 |
| Polyacrylonitrile | 3.7 | 25 |

As illustrated in Table 2, it is clarified that the pore size and the porocity of metal particles are discriminated according to polymer kinds, because the degree of dispersion varies. Especially, polysulfone polymer was shown to be excellent.

Comparative Example 1

A nickel membrane was prepared by performing the same procedure described in Example 1, but the step sintering was accomplished directly after skipping over the step oxidizing polymers.

As a result, nickel membrane was observed to have 8μm of pore size, 32% of porocity and 0.2 mm of thickness.

Comparative Example 2

The polysulfone polymer membranes and the ceramic membrane disclosed in Korean Patent Publication No. 1994-7006 were prepared by conventional processes.

Metallic hollow membranes prepared in Examples 1-4 and Comparative Example 1-2 were examined to measure the mechanical and chemical properties as described below. The results are summarized in Table 3.

[Measurement of Physical Property]
1. Tensile strength: strength measured when stretching longitudinally in a fixed power to break.
2. Impact strength: strength measured when impacting longitudinally and perpendicularly in a fixed power to destroy.
3. Intensity of reverse-cleaning: intensity measured when increasing the inside pressure of membrane to destroy by filling water.
4. Chemical stability: tensile strength measured after submerging for 24 hours in 10 wt % of HCl and NaOH.

TABLE 3

| Items | Tensile strength (kg/fiber) | Impact strength (kg/fiber) | Intensity of reverse-cleaning (kg) | Chemical stability (kg/fiber) |
|---|---|---|---|---|
| Example 1 | 70,000 | 25 | 42 | 60,000 |
| Comparative Example 1 | 30,000 | 15 | 35 | 25,000 |
| Comparative Example 2 (ceramic membrane) | 40,000 | 1 | 23 | 30,000 |
| Comparative Example 2 (polymer membrane) | 2,000 | 22 | 3 | 20 |

As illustrated in Table 3, the metallic hollow membranes prepared by the process of the present invention can improve the mechanical properties such as tensile strength, impact strength and intensity of reverse-cleaning, and enable to maintain the physical property to increase chemical stability when sintering is completed, as compared to the ceramic membrane and the polymer membrane described in Comparative Example 2. However, if polymers are not oxidized, they may be reduced by hydrogens and carbonized to leave behind metal particles. The polymer remnants may prevent metal particles from being sintered and thus affect the physical properties of the resulting membrane.

INDUSTRIAL APPLICABILITY

As illustrated and confirmed above, the metallic hollow membranes of the present invention can be modified in the shape, maintain the small size of pore and the high porocity and has the excellent mechanical and chemical property. Therefore, the metallic membrane of the present invention can be applied widely in industrial fields.

Those skilled in the art will appreciate that the conceptions and specific embodiments disclosed in the foregoing description may be readily utilized as a basis for modifying or designing other embodiments for carrying out the same purposes of the present invention.

Those skilled in the art will also appreciate that such equivalent embodiments do not depart from the spirit and scope of the invention as set forth in the appended claims.

What is claimed is:

1. A method for preparing a metallic membrane comprising:
   (a) preparing a membrane precursor by a step consisting of dissolving 80-95 wt % of transition metal of Period 3 and its alloy powder having 0.01-20 μm of particle size and 5-20 wt % of synthetic polymer in a polar solvent and then radiating or casting it;
   (b) oxidizing the synthetic polymer on the membrane precursor in an atmosphere of nitrogen and hydrogen without oxygen at 400-600° C.; and
   (c) sintering the resulting membrane precursor at 900-1,300° C. under a mixed gaseous atmosphere of nitrogen and hydrogen to prepare a metallic membrane.

2. The method for preparing a metallic membrane according to claim 1, wherein the transition metal of Period 3 and its alloy is selected from the group consisting of nickel, titanium, aluminum, copper, iron and stainless steel.

3. The method for preparing a metallic membrane according to claim 1, wherein the synthetic polymer is selected from the group consisting of polysulfones, vinyls, celluloses, nylons and polyesters.

4. The method for preparing a metallic membrane according to claim 1, wherein the polar solvent is selected from the group consisting of N-methyl-2-pyrrolidone, dimethyl formamide, dimethyl acetamide and dimethyl sulfoxide.

5. The method for preparing a metallic membrane according to claim 1, wherein nitrogen and hydrogen gases are respectively used in the volume ratio of 70-98:2-30 in steps (b) and (c).

6. The method for preparing a metallic membrane according to claim 1, wherein the metallic membrane has 0.01-10 μm of pore size and 30-50% of porosity.

7. The method for preparing a metallic membrane according to claim 1, wherein the metallic membrane is manufactured in a hollow membrane, a flat sheet membrane or a capillary membrane.

8. A method for preparing a metallic membrane comprising:
   (a) preparing a membrane precursor by a step consisting of dissolving 80-95 wt % of transition metal of Period 3 and its alloy powder having 0.01-20 μm of particle size and 5-20 wt % of synthetic polymer in a polar solvent and then radiating or casting it;
   (b) oxidizing the synthetic polymer on the membrane precursor in an atmosphere consisting of nitrogen and hydrogen without oxygen at 400-600° C.; and
   (c) sintering the resulting membrane precursor at 900-1,300° C. under a mixed gaseous atmosphere consisting of nitrogen and hydrogen to prepare a metallic membrane.

9. The method for preparing a metallic membrane according to claim 8, wherein the transition metal of Period 3 and its alloy is selected from the group consisting of nickel, titanium, aluminum, copper, iron and stainless steel.

10. The method for preparing a metallic membrane according to claim 9, wherein the synthetic polymer is selected from the group consisting of polysulfones, vinyls, celluloses, nylons and polyesters.

11. The method for preparing a metallic membrane according to claim 10, wherein the polar solvent is selected from the group consisting of N-methyl-2-pyrrolidone, dimethyl formamide, dimethyl acetamide and dimethyl sulfoxide.

12. The method for preparing a metallic membrane according to claim 11, wherein nitrogen and hydrogen gases are respectively used in the volume ratio of 70-98:2-30 in step (c).

13. A method for preparing a metallic membrane consisting of:
   (a) dissolving 80-95 wt % of transition metal of Period 3 and its alloy powder having 0.01-20 μm of particle size and 5-20 wt % of synthetic polymer in a polar solvent and then radiating or casting it to prepare a membrane precursor;

(b) oxidizing the synthetic polymer on the membrane precursor in an atmosphere consisting of nitrogen and hydrogen without oxygen at 400-600° C.; and (c) sintering the resulting membrane precursor at 900-1,300° C. under a mixed gaseous atmosphere consisting of nitrogen and hydrogen to prepare a metallic membrane.

14. The method for preparing a metallic membrane according to claim 13, wherein the transition metal of Period 3 and its alloy is selected from the group consisting of nickel, titanium, aluminum, copper, iron and stainless steel.

15. The method for preparing a metallic membrane according to claim 14, wherein the synthetic polymer is selected from the group consisting of polysulfones, vinyls, celluloses, nylons and polyesters.

16. The method for preparing a metallic membrane according to claim 15, wherein the polar solvent is selected from the group consisting of N-methyl-2-pyrrolidone, dimethyl formamide, dimethyl acetamide and dimethyl sulfoxide.

17. The method for preparing a metallic membrane according to claim 16, wherein nitrogen and hydrogen gases are respectively used in the volume ratio of 70-98:2-30 in step (c).

* * * * *